(12) United States Patent
Dadheech et al.

(10) Patent No.: US 8,497,050 B2
(45) Date of Patent: Jul. 30, 2013

(54) AMORPHOUS CARBON COATINGS FOR FUEL CELL BIPOLAR PLATES

(75) Inventors: Gayatri Vyas Dadheech, Rochester Hills, MI (US); Thomas A. Trabold, Pittsford, NY (US); Youssef M. Mikhail, Sterling Heights, MI (US); Mahmoud H. Abd Elhamid, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 833 days.

(21) Appl. No.: 12/181,864

(22) Filed: Jul. 29, 2008

(65) Prior Publication Data

US 2010/0028743 A1 Feb. 4, 2010

(51) Int. Cl.
*H01M 4/64* (2006.01)
*H01M 8/00* (2006.01)

(52) U.S. Cl.
USPC ............ 429/521; 429/400; 429/517; 429/518

(58) Field of Classification Search
USPC .................................. 429/400, 512, 517, 521
See application file for complete search history.

(56) References Cited

U.S. PATENT DOCUMENTS

| | | | | |
|---|---|---|---|---|
| 7,067,175 B2 * | 6/2006 | Veerasamy | ................ | 427/249.7 |
| 7,740,971 B2 * | 6/2010 | Kanba et al. | ................... | 429/514 |
| 8,119,242 B2 * | 2/2012 | Iseki et al. | ..................... | 428/408 |
| 2004/0005502 A1 * | 1/2004 | Schlag | ........................... | 429/245 |
| 2010/0285396 A1 * | 11/2010 | Vyas et al. | ..................... | 429/518 |

FOREIGN PATENT DOCUMENTS

| | | |
|---|---|---|
| DE | 102 30 395 A1 | 1/2004 |
| DE | 10 2007 003 825 A1 | 1/2007 |
| DE | 10 2007 038 171 A1 | 3/2008 |
| JP | 2000067881 A * | 3/2000 |
| JP | 2004217977 A * | 8/2004 |
| WO | WO 2007136131 A1 * | 11/2007 |

* cited by examiner

*Primary Examiner* — Patrick Ryan
*Assistant Examiner* — Aaron Greso
(74) *Attorney, Agent, or Firm* — Brooks Kushman P.C.

(57) ABSTRACT

A flow field plate for fuel cell applications includes a metal with a non-crystalline carbon layer disposed over at least a portion of the metal plate. The non-crystalline carbon layer includes an activated surface which is hydrophilic. Moreover, the flow field plate is included in a fuel cell with a minimal increase in contact resistance. Methods for forming the flow field plates are also provided.

16 Claims, 9 Drawing Sheets

AMORPHOUS CARBON COATINGS FOR FUEL CELL BIPOLAR PLATES

BACKGROUND OF THE INVENTION

1. Field of the Invention

In at least one embodiment, the present invention is related to bipolar plates used in PEM fuel cells 2. Background Art Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, these metallic plates typically include a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate. Moreover, metallic bipolar plates are also subjected to corrosion during operation. Degradation mechanism includes the release of fluoride ions from the polymeric electrolyte. Metal dissolution of the bipolar plates typically results in release of iron, chromium and nickel ions in various oxidation states.

For water management, it is desirable for metal bipolar plates to have a low contact angle at the bipolar plate/water border; that is, a contact angle less than 40°. Titanium nitride coatings have been proposed as corrosion-resistant plating for bipolar plates. Although titanium nitride coatings are cost-effective, such coatings do not provide satisfactory protection for the bipolar plate material. Further, titanium nitride coatings develop relatively low water affinity with a contact angle close to 60°.

Accordingly, there is a need for improved methodology for lowering the contact resistance at the surfaces of bipolar plates used in fuel cell applications.

SUMMARY OF THE INVENTION

The present invention solves one or more problems of the prior art by providing in at least one embodiment a flow field plate for use in fuel cell. The flow field plate of this embodiment comprises a metal plate with a non-crystalline carbon layer disposed over at least a portion of the metal plate.

In another embodiment, a fuel cell incorporating the flow field plate set forth above is provided. The fuel cell includes a first flow field plate with a surface coated with a non-crystalline carbon film. A first catalyst layer is disposed over the first flow field plate. A polymeric electrolyte is disposed over the first flow field plate, which a second catalyst layer over the polymeric electrolyte. Finally, a second flow field plate is disposed over the second catalyst layer. Gas diffusion layer are provided as needed.

In still another embodiment, a method for forming the flow field plate set forth above is provided. The method comprises depositing a non-crystalline carbon layer on a metallic plate followed by activating the carbon layer surface.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

The terms "roughness average" or "surface roughness average" as used herein means arithmetic average of the absolute values of the profile height deviations. The roughness average may be determined in accordance with ANSI B46.1. The entire disclosure of this reference is hereby incorporated by reference.

The term "non-crystalline carbon layer" as used herein means a layer comprising at least 80 weight percent carbon with less than 10 weight percent of the layer being crystalline. Typically, non-crystalline carbon layers are at least 90 weight percent carbon with less than 5 weight percent of the layer being crystalline. In a refinement, non-crystalline carbon layers are substantially amorphous carbon.

In an embodiment of the present invention, a flow filed plate for use in fuel cell applications is provided. The flow field plate of this embodiment comprises a metal plate with a non-crystalline carbon layer disposed over at least a portion of the metal plate. The present embodiment encompasses both unipolar and bipolar plates.

Figure 1A:
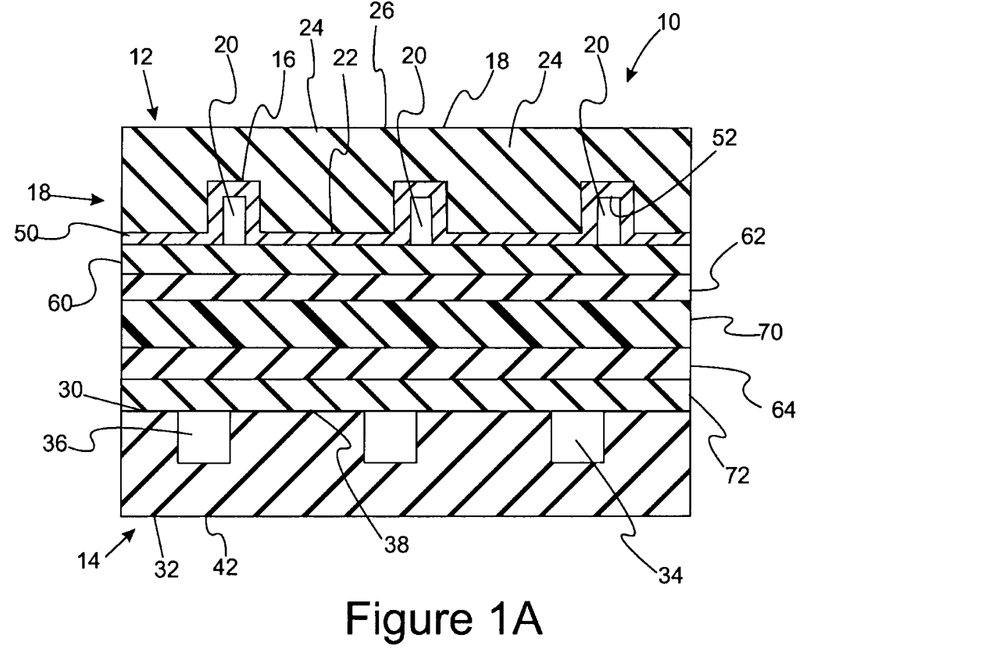
FIG. 1A provides a cross sectional view of a fuel cell incorporating an exemplary embodiment of an non-crystalline carbon layer on a unipolar plate.
Figure 1B:
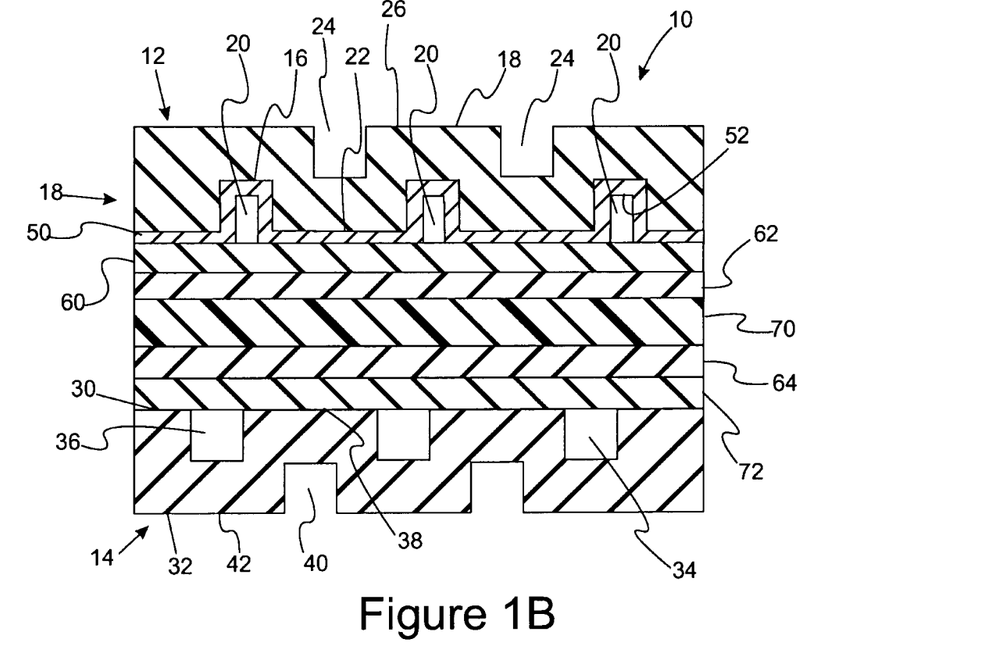
FIG. 1B provides a cross sectional view of a fuel cell incorporating an exemplary embodiment of an non-crystalline carbon layer on a bipolar plate.

With reference to FIGS. 1A and 1B, a schematics cross section of fuel cells incorporating the flow field plates of this embodiment is provided. Fuel cell 10 includes flow field plates 12, 14. Typically, flow field plates 12, 14 are made from a metal such as stainless steel. Flow field plate 12 includes surface 16 and surface 18. Surface 16 defines channels 20 and lands 22. FIG. 1A provides a depiction in which flow field plate 12 is a unipolar plate. FIG. 1B provides a depiction in which flow field plate 12 is a bipolar plate. In this variation, 18 defines channels 24 and lands 26. Similarly, flow field 14 includes surface 30 and surface 32. Surface 30 defines channels 36 and lands 38. FIG. 1A provides a depiction in which flow field plate 14 is a unipolar plate. FIG. 1B provides a depiction in which surface 32 defines channels 40 and lands 42.

Still referring to FIG. 1, non-crystalline carbon layer 50 is disposed over and contacts surface 16. In a variation, non-crystalline carbon layer 50 includes surface 52 having a contact angle less than about 30 degrees.

Still referring to FIG. 1, fuel cell 10 further includes gas diffusion layer 60 and catalyst layers 62, 64. Polymeric ion conductive membrane 70 is interposed between catalyst layers 62, 64. Finally, fuel cell 10 also includes gas diffusion layer 72 positioned between catalyst layer 64 and flow field plate 14.

In a variation of the present invention, a first gas is introduced into channels 20 and a second gas is introduced into channels 36. Channels 20 direct the flow of the first gas and channels 36 direct the flow of the second gas. In a typically fuel cell application, an oxygen-containing gas is introduced into channels 20 and a fuel is introduced into channels 36. Examples of useful oxygen containing gases include molecular oxygen (e.g., air). Examples of useful fuels include, but are not limited to, hydrogen. When an oxygen-containing gas is introduced into channels 20, water is usually produced as a by-product which must be removed via channels 20. In this variation, catalyst layer 62 is a cathode catalyst layer and catalyst layer 64 is an anode catalyst layer.

Figure 2:
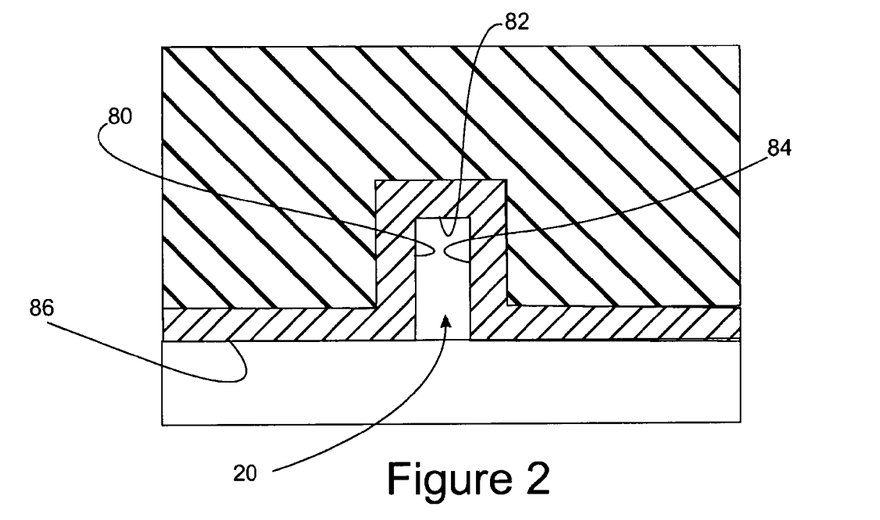
FIG. 2 provides a cross sectional view of a bipolar plate channel coated with a non-crystalline carbon layer.

With reference to FIG. 2, a magnified cross sectional view of channel 20 is provided. Surfaces 80, 82, 84 of non-crystalline carbon layer 50 provide exposed surfaces in channel 20. Advantageously, these surfaces of non-crystalline carbon layer 50 are hydrophilic, having a contact angle less than about 30 degrees. In another refinement, the contact angle is less than about 20 degrees. The hydrophilic nature of non-crystalline carbon layer 50 prevents water from agglomerating in channels 20. In a refinement of the present embodiment, the hydrophilicity of non-crystalline carbon layer 50 is improved by activating surface 52 (i.e., surfaces 80, 82, 84, 86). In a variation of the present embodiment, the surface is activated by a plasma (e.g., RF plasma, DC plasma, microwave plasma, hot filament plasma, open air plasma, and the like). In one refinement, the activation is accomplished by exposing the non-crystalline carbon layers to a reactive oxygen plasma which would activate the non-crystalline carbon layers by breaking bonds and forming hydroxyl, carboxyl and aldehyde functional groups. In another refinement, the post treatment is accomplished by exposing the non-crystalline carbon layers to reactive gases nitrogen, nitrous oxide, nitrogen dioxide, ammonia or mixture thereof, which activate the non-crystalline carbon layers by breaking bonds and forming nitrogen-based derivatives like amines, amide, and diazo functional groups. Accordingly, the post-treatment activation is able to increase the amounts of nitrogen and/or oxygen in non-crystalline carbon layer 50. In another refinement, the activation of surface 52 results in an increase in porosity as compared to the surface prior to activation. In a further refinement, surface 52 includes regions in which there at least 10 pores per $\mu m^2$ of surface area. Moreover, surface 52 includes on average at least 5 pores per $\mu m^2$ of surface area. The number of pores per $\mu m^2$ is calculated by counting the number of pores in a given area observed in a scanning electron micrograph.

The porosity of non-crystalline carbon layer 50 is also characterized by the roughness average of surface 52. In a variation, the roughness average of surface 52 is from about 200 to about 1000 nm. In another variation, the roughness average of surface 52 is from about 300 to about 900 nm. In still another variation, the roughness average of surface 52 is from about 400 to about 700 nm.

The non-crystalline carbon layer of the present invention is electrically conductive. The electrically conductivity of non-crystalline carbon layer 50 is such that the contact resistance of fuel cell 10 is less than about 20 mohm-$cm^2$. In a variation of an exemplary embodiment, non-crystalline carbon layer 50 is doped in order to increase the electrical conductivity. In one refinement, non-crystalline carbon layer 50 is doped. In a further refinement the dopant is a metal. Examples of suitable metal dopants include, but are not limited to, Pt, Ir, Pd, Au, Ag, Co, Fe, Cu, Si, Ti, Zr, Al, Cr, Ni, Nb, Hb, Mo, W, and Ta. In another refinement, the dopant is a nonmetal such as nitrogen.

Figure 3:
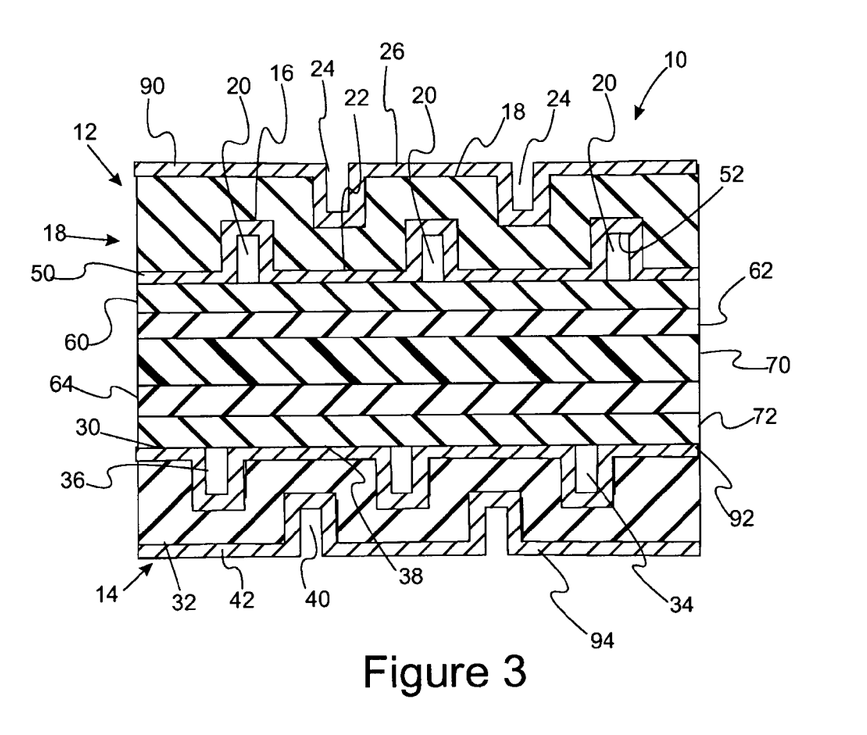
FIG. 3 provides a cross sectional view of a fuel cell incorporating another exemplary embodiment of an amorphous carbon layer on a bipolar plate.

With reference to FIG. 3, a schematic cross section illustrating additional surfaces of fuel cell bipolar plates coated with non-crystalline carbon layers is provided. In this variation, one or more of surfaces 18, 30, and 32 are coated with a non-crystalline carbon layer 50. As set forth above, in connection with the description of FIGS. 1A and 1B, fuel cell 10 includes flow field plates 12, 14. Bipolar plate 12 includes surface 16 and surface 18. Surface 16 defines channels 20 and lands 22. Surface 18 defines channels 24 and lands 26. Similarly, bipolar plate 14 includes surface 30 and surface 32. Surface 30 defines channels 36 and lands 38. Surface 32 defines channels 40 and lands 42.

Still referring to FIG. 3, non-crystalline carbon layer 50 is disposed over and contacts surface 16. In a variation, non-crystalline carbon layer 50 includes surface 52 having a contact angle less than about 30 degrees. Similarly, non-crystalline carbon layer 90 is disposed over and contacts surface 18, non-crystalline carbon layer 92 is disposed over and contacts surface 30, and non-crystalline carbon layer 94 is disposed over and contacts surface 32. Fuel cell 10 further includes gas diffusion layer 60 and catalyst layers 62, 64. Polymeric ion conductive membrane 70 is interposed between catalyst layers 62, 64. Finally, fuel cell 10 also includes gas diffusion layer 72 positioned between catalyst layer 64 and bipolar plate 14. The details of non-crystalline carbon layers 50, 92, 94 are set forth above in connections with the description of FIG. 1.

Figure 4A:
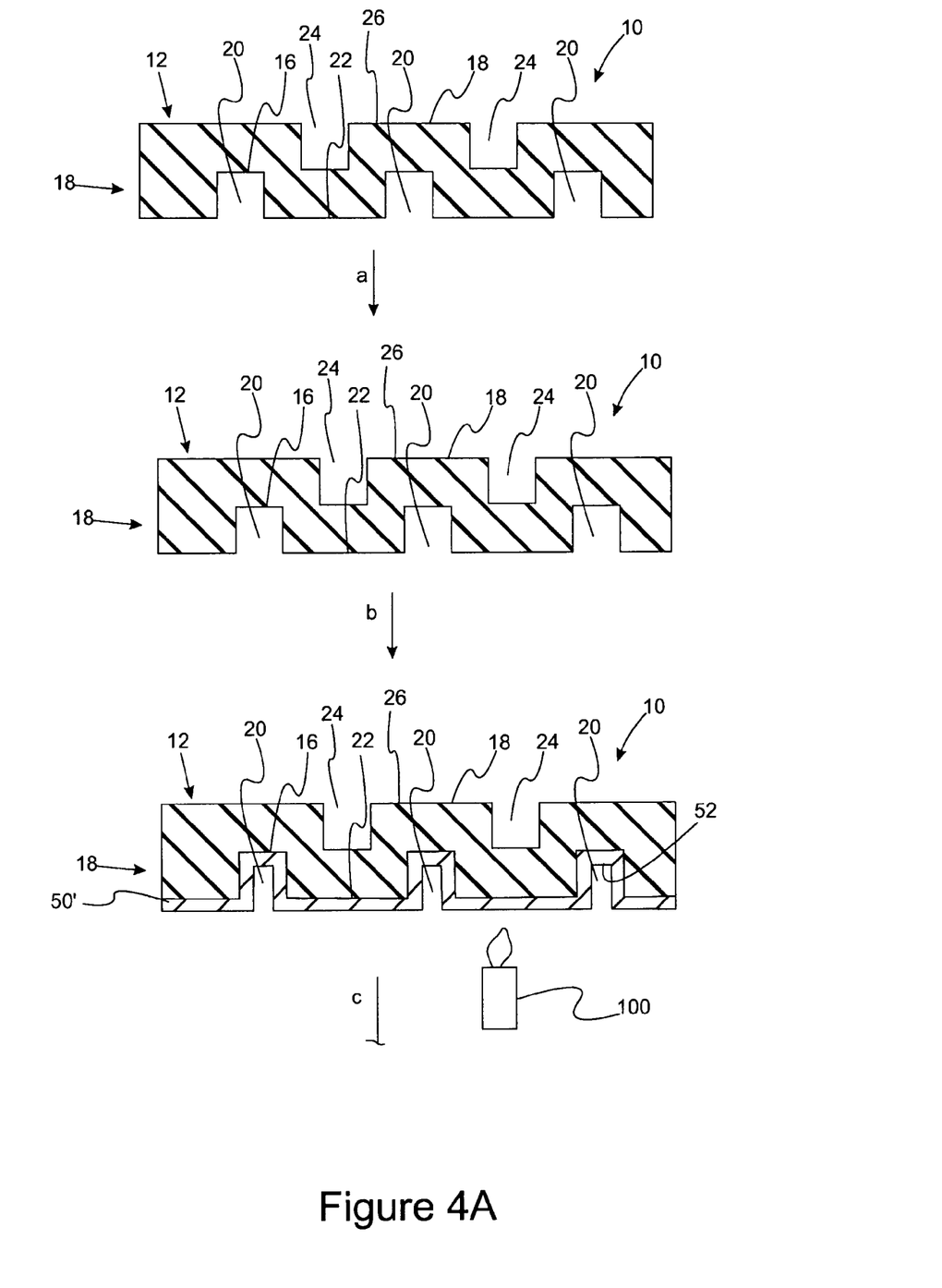
FIGS. 4A and 4B provide a flowchart illustrating an exemplary method for making a bipolar plate coated with a non-crystalline carbon layer.
Figure 4B:
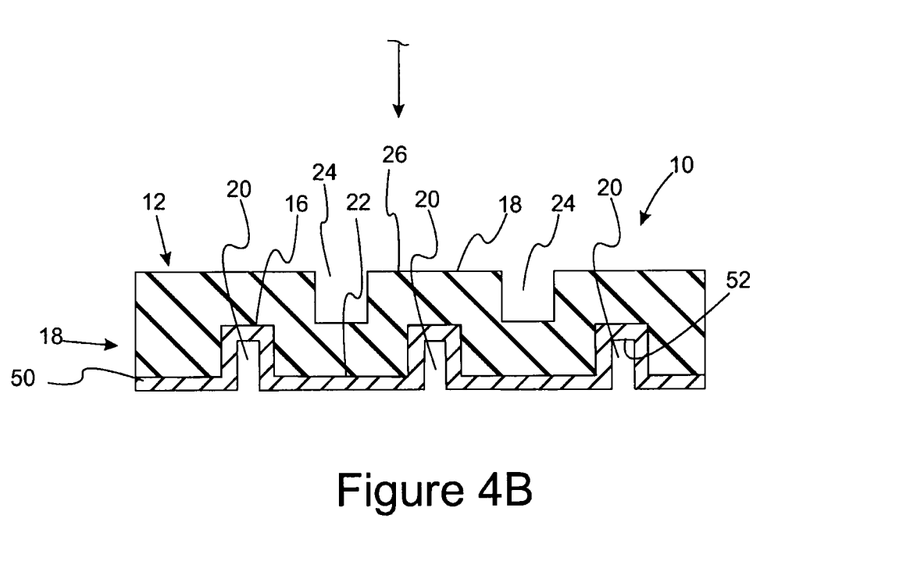

With reference to FIGS. 4A and 4B, a pictorial flowchart illustrating an exemplary method of forming the flow field plates set forth above is provided. In step a), metal plate 12 is pre-conditioned prior to deposition of non-crystalline carbon layer 50. During such preconditioning oxides on the surface of metal plate 12 are typically removed or at least reduced. Such pretreatment may include a cleaning step. In step b), non-crystalline carbon layer 50 is deposited onto metal plate 12. The non-crystalline carbon layer may be formed by a number of technologies known to those skilled in the art. Examples of such technologies include, but are not limited to sputtering (e.g., magnetron, unbalanced magnetron, etc), chemical vapor deposition ("CVD") (e.g., low pressure CVD, atmospheric CVD, plasma enhanced CVD, laser assisted CVD, etc), evaporation (thermal, e-beam, arc evaporation, etc.) and the like. U.S. Pat. No. 5,314,716 discloses a CVD technique for forming non-crystalline carbon films. The entire disclosure of the patent is hereby incorporated by reference. In step c), surface 52 of non-crystalline carbon layer 50 is activated. FIGS. 4A and 4B depict plasma activation via high density plasma 100. It should also be appreciated that additional methods of activation may be utilized. Such methods include, but are not limited to, chemical activation such as treatment (e.g., etching) of the surface with an acid such as sulfuric acid, hydrofluoric acid, chromic acid, potassium permaganate, and the like.

In a variation of the present embodiment, non-crystalline carbon layers are deposited by sputtering. In one refinement, the carbon layers are deposited using a closed field unbalanced magnetron system. For this purpose, a variation of the method and apparatus set forth in U.S. Pat. No. 6,726,993 (the '993 patent). The entire disclosure of the '993 patent is hereby incorporated by reference in its entirety.

Figure 5:
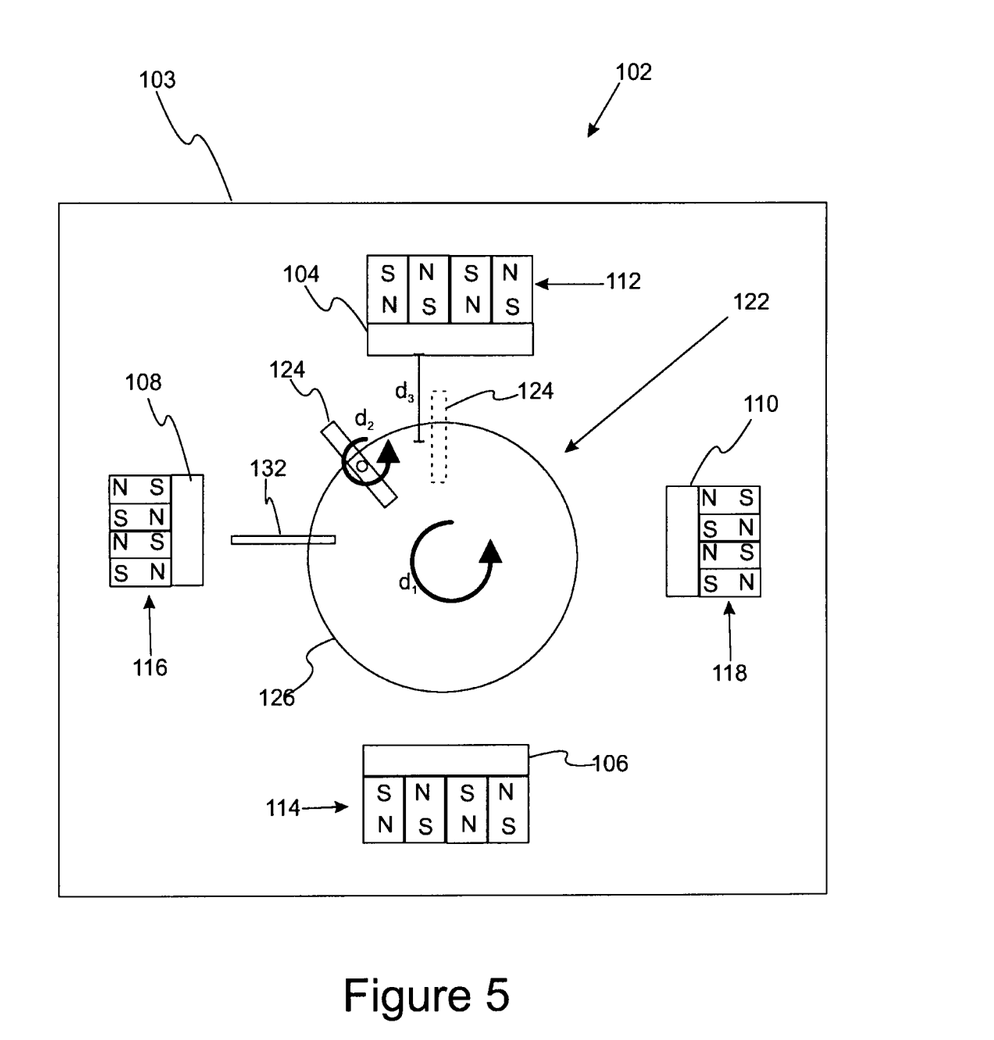
FIG. 5 is a schematic illustration of a sputtering system used to deposit carbon layers.

With reference to FIG. 5, a refinement of a sputtering deposition system for depositing the non-crystalline carbon layers set forth above is provided. FIG. 5 provides a schematic top view of the sputtering system. Sputtering system 102 includes deposition chamber 103 and sputtering targets 104, 106, 108, 110 which are proximate to magnet sets 112, 114, 116, 118. A magnetic field generated between the targets 104, 106, 108, 110 is characterized with field lines extending to between the magnetrons forming a closed field. The closed field forms a barrier, which prevents the escape of electrons within plasma containing area 122. Moreover, this configuration promotes ionization in the space within the closed field with increased ion bombardment intensity. High ion current density is thereby achieved. Substrate 124 (i.e., metal plate 12) is held on platform 126 which rotates along direction $d_1$. Flipper 132 causes rotation of substrate 124 about direction $d_2$ during a cycle of platform 126. In one example, sputtering targets 104, 106 are carbon target while sputtering targets 108, 110 include metal dopants. Moreover, in this example, magnet sets 112, 114 provide a more intense magnetic field than magnet sets 116, 118. This magnetic imbalance allows for less dopant to be sputtered than carbon. When system 102 is utilized, pre-conditioning step a) is advantageously performed by ion etching within deposition chamber 103. It has also been surprisingly discovered that placement of substrate 124 relatively close to sputtering targets 104, 106, 108, 110 tends to form non-crystalline carbon as opposed to graphitic carbon. In one example, distance $d_3$, which is the closest distance from the center of substrate 124 to target 104 during movement of the substrate is from about 5 cm to about 20 cm.

In one variation of the present, graphite targets are sputtered in a chamber under the influence of a closed field unbalances magnetron field. A useful sputtering system is the Teer UDP 650 system. Two graphite targets are placed on strong magnetrons that may be sputtered at a current ranging from 5A-50A in a closed field magnetron arrangement. Two metal dopant targets are placed on two weaker magnets. The pressure in the sputter chamber may range from $1 \times 10^{-6}$ to $1 \times 10^{-4}$, a bias voltage of −400V to −20V, pulse width of 250 nanosecond to 2,000 nanosecond, and pulse DC at frequency rate of 400 KHz to 50 KHz, and argon flow rate of 200 sccm to 20 sccm for a time period of 10 minutes to 500 minutes. The film may be deposited in a thickness ranging from 5 nm to 1,000 nm, or 10 nm to 50 nm.

Figure 6A:
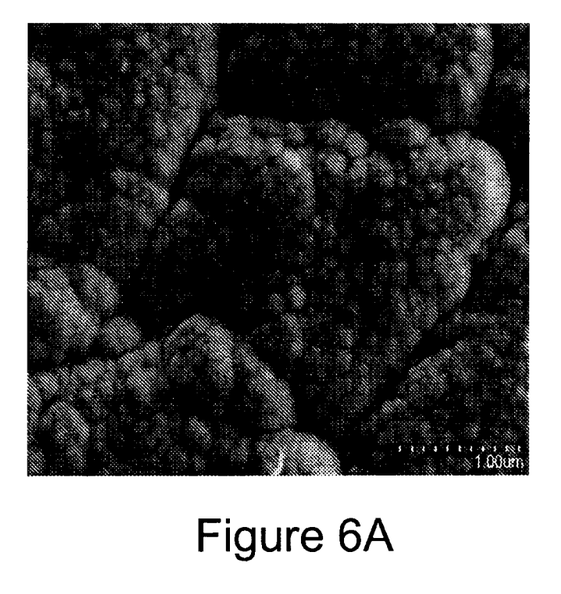
FIG. 6A is a scanning electron micrograph of an un-plasma treated carbon layer.
Figure 6B:
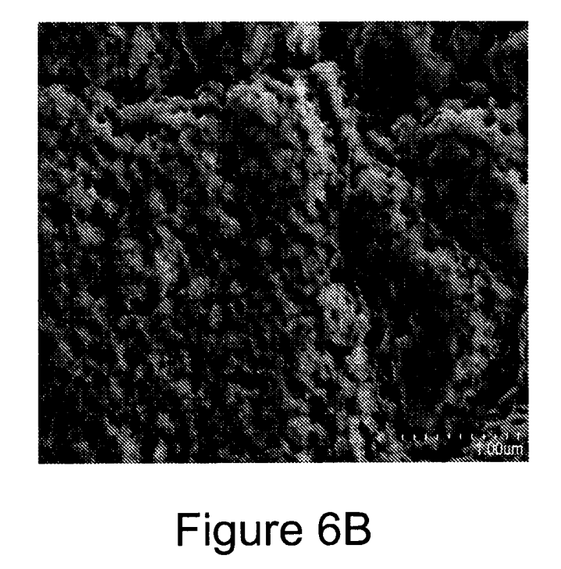
FIG. 6B is a scanning electron micrograph of plasma treated carbon layer.
Figure 7:
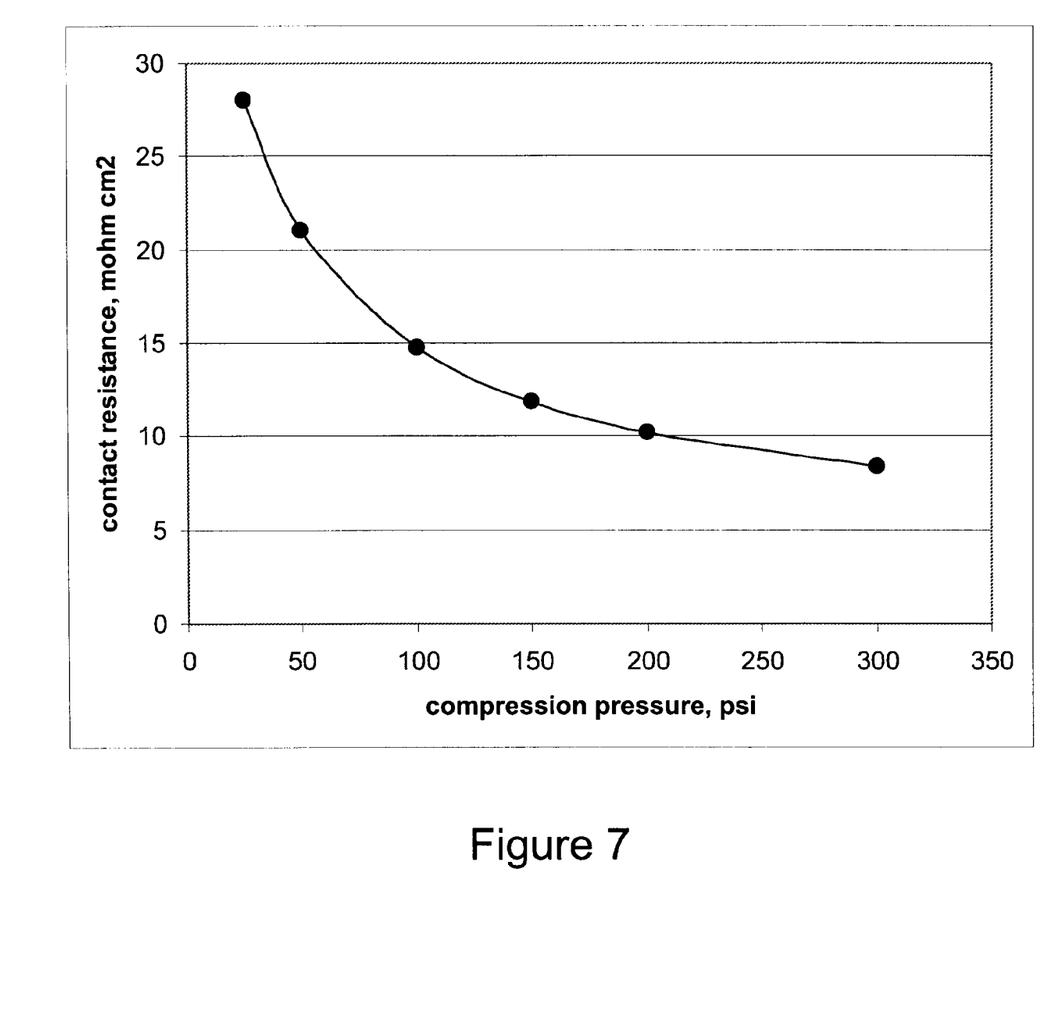
FIG. 7 provides a plot of contact resistance versus pressure for a fuel cell incorporating a carbon coated bipolar plate.
Figure 8:
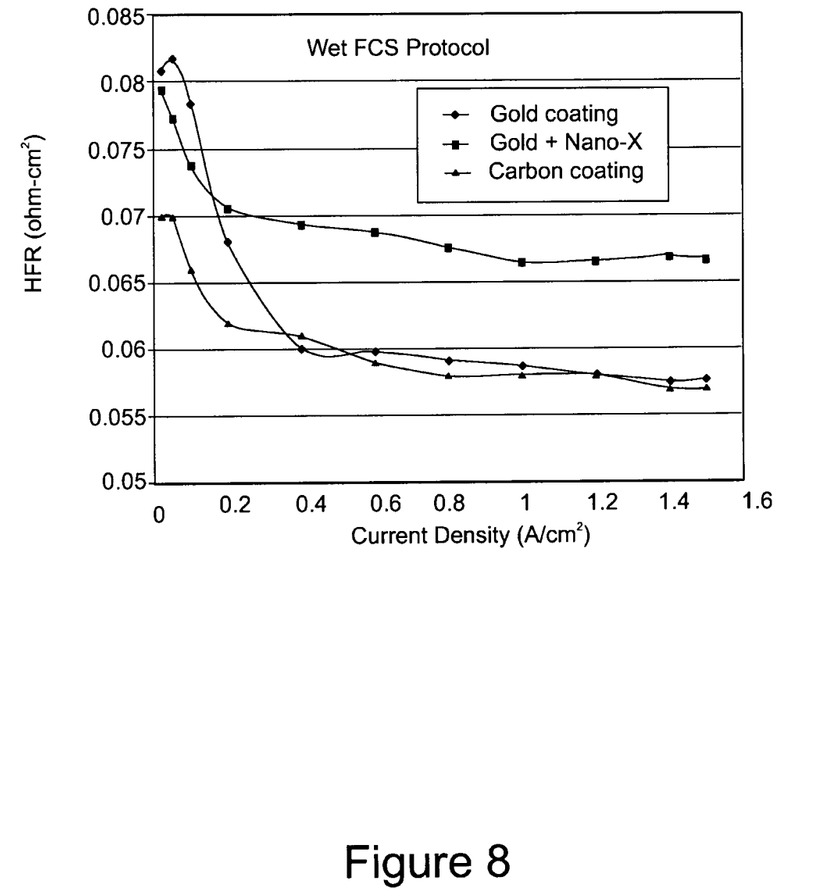
FIG. 8 is a plot of the high frequency resistance (HFR) verses current density for fuel cells incorporating a carbon coated bipolar plate.

FIG. 6A and 6B provides scanning electron micrographs of amorphous carbon layers deposited on stainless steel. FIG. 6A shows the an untreated carbon surface while FIG. 6B provides the plasma treated surface. The samples are determined to be amorphous due to the absence of peaks in an X-ray diffraction spectrograph. FIG. 7 provides a plot of contact resistance versus pressure. The pressure in these measurement is the pressure applied to a multilayer structure including a non-crystalline carbon coated metal plate. At pressures representative of fuel cell application (>100 psi), the contact resistance is observed to be less than 10 mohm-$cm^2$. Further evidence of the low contact resistances afforded by the carbon coated bipolar plates is demonstrated in FIG. 8. FIG. 8 is a plot of the high frequency resistance (HFR) verses current density for fuel cells incorporating the bipolar plate. Low HFRs are clearly demonstrated, particularly at current densities greater than 0.4 $A/cm^2$.

Figure 9:
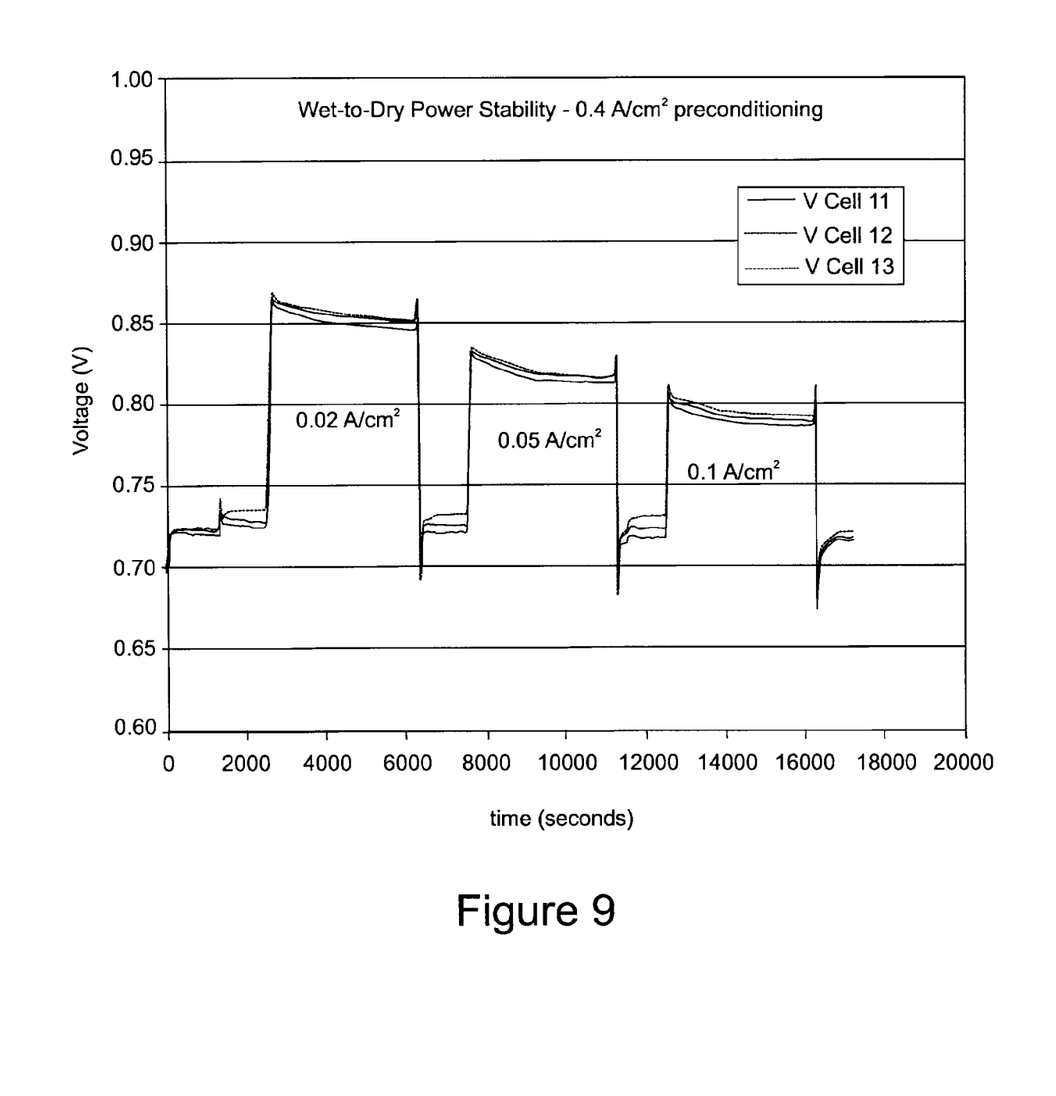
FIG. 9 provides plots for three fuel cell in a stack of fuels cells to assess the wet-to-dry power stability.

The stability of fuel cell stacks that include fuel cells utilizing a bipolar plate coated with a non-crystalline carbon layer is evaluated. FIG. 9 provide plots for three fuel cell in a stack of fuel cells to assess the wet-to-dry power stability. The fuel cells in this experiment are first preconditioned with a current density of 0.4 $A/cm^2$. At various times the current densities are held constant. The over-lapping plots at each of the test current densities is evidence that none of the cells are failing. In particular, the over-lap of the plots at the 0.02 $A/cm^2$ current density is good evidence that the carbon layer is allowing effective removal of water since at this low density the oxygen-containing feed gas is at a very low flow rate which could possibly make water removal difficult should the water not easily slid off the channels in the bipolar plate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A flow field plate for fuel cell applications comprising:
a metal plate having a first surface and a second surface, the first surface defining a plurality of channels for directing flow a first gaseous composition; and
a non-crystalline carbon layer disposed over at least a portion of the metal plate, the non-crystalline carbon layer having a carbon layer surface with a contact angle less than about 30 degrees, the non-crystalline carbon layer being doped with a dopant atom and having at least 90 weight percent carbon with less than 5 weight percent of the layer being crystalline, the carbon layer surface being an activated surface having nitrogen atoms.

2. The flow field plate of claim 1 wherein the contact angle is less than 20 degrees.

3. The flow field plate of claim 1 wherein the dopant atom is a metal atom.

4. The flow field plate of claim 1 wherein the non-crystalline carbon layer comprises amorphous carbon.

5. The flow field plate of claim 1 wherein the carbon layer surface includes oxygen atoms.

6. The flow field plate of claim 5 wherein the carbon layer surface includes on average at least 5 pores per $\mu m^2$.

7. The flow field plate of claim 5 wherein the non-crystalline carbon layer has a roughness average from about 200 to about 1000 nm.

8. The flow field plate of claim 1 wherein the second surface defines a plurality of channels for directing flow of a second gaseous composition.

9. The flow field plate of claim 1 wherein the second surface is a second non-crystalline carbon layer.

10. A fuel cell comprising:
a first flow field plate comprising:
a metal plate having a first surface and a second surface, the first surface defining a plurality of channels for directing flow a first gaseous composition; and
a non-crystalline carbon layer disposed over at least a portion of the metal plate, the non-crystalline carbon layer having a carbon layer surface with a contact angle less than about 30 degrees, the non-crystalline carbon layer being doped with a dopant atom and having at least 90 weight percent carbon with less than 5 weight percent of the layer being crystalline, the carbon layer surface being an activated surface having nitrogen atoms.;
a first catalyst layer disposed over the first flow field plate;
a ion conductor layer disposed over the first catalyst layer;
a second catalyst layer disposed over ion conductor layer; and
a second flow field plate disposed over the second catalyst layer.

11. The fuel cell of claim 10 having a contact resistance less than about 20 mohm-$cm^2$.

12. The fuel cell of claim 10 wherein the contact angle is less than 20 degrees.

13. The fuel cell of claim 10 wherein the dopant atom is a metal atom.

14. The fuel cell of claim 10 wherein the carbon layer surface includes oxygen atoms.

15. The fuel cell of claim 10 wherein the carbon layer surface includes on average at least 5 pores per $\mu m^2$.

16. The fuel cell of claim 10 wherein the non-crystalline carbon layer has a roughness average from about 50 to about 300 nm.

* * * * *